Feb. 22, 1949.　　　　J. J. MOYNIHAN　　　　2,462,533
ELECTRIC THRUST DEVICE
Filed Aug. 13, 1945　　　　　　　　　　　2 Sheets-Sheet 2

INVENTOR.
JOHN J. MOYNIHAN
BY
Bosworth + Sessions
ATTORNEYS

Patented Feb. 22, 1949

2,462,533

UNITED STATES PATENT OFFICE 2,462,533

ELECTRIC THRUST DEVICE

John J. Moynihan, Boston, Mass., assignor of one-half to Joseph B. Brennan, Bratenahl, Ohio Application August 13, 1945, Serial No. 610,580

5 Claims. (172—290)

This invention relates to a device for producing translatory motion of a thrust member by electrical means.

Devices of the type indicated for producing straight line motion are well known and have a variety of fields of application. The required motion has been attained in prior devices by the use of hydraulic and pneumatic cylinders in which the thrust member is operated by a piston-cylinder combination to which fluid is fed at the required operating pressure. These units usually require a dual cylinder arrangement to provide for movement of the thrust member back and forth in two directions. Solenoid-operated electromagnets in which the thrust member takes the form of an armature that is reciprocated when the coil is energized also are known. Such devices have a variety of uses where a positive straight line motion is required, although each is subject to definite limitations and also to problems of installation and power supply that combine to limit their usefulness.

In the case of piston-cylinders operated by fluid means, considerable space is required to handle the fluid and raise it to and maintain it at the required operating pressure. Furthermore, some leakage occurs between the piston and cylinder and at other parts of the system requiring replenishment of the fluid and reestablishment of the operating pressure. In the case of liquids this leakage, especially when aggravated by wear of the parts, frequently results in a messy installation. In general, such installations require equipment auxiliary to the actual piston-cylinder that presents many more problems of space and maintenance than the actual piston-cylinder itself. Solenoid electromagnets have an inherent disadvantage in that their construction precludes their use where a relatively long stroke is required. The range of application of the field of the coil as it moves the thrust member or armature is definitely limited by the axial length of the coil.

It is a general object of the present invention to produce a thrust mechanism based on electrical principles heretofore foreign to this or similar fields of use and embodying the best features of the prior devices in a new fashion. Still another object of the invention is to produce a mechanism for axial movement of a thrust member with great force and over considerable distance, in each case greater than has heretofore been attained. A further object of the invention is to produce a compact mechanism that is simple to construct and has a minimum of moving parts. An additional object of the invention is to provide such a motion-translating device in which no auxiliary equipment is required except a power source that generally is already present for other purposes at the site of the installation.

Other objects of the invention will become apparent from the specification and accompanying drawings. It is to be understood that the embodiments hereafter described, while preferred, are not the only form my invention can take. I contemplate that numerous minor changes are possible within the scope of my concept. The novel features of the invention are summarized in the claims.

In general, the device of the present invention, while operated through the application of an electric current, is very different from the known solenoid electromagnetic devices by which translatory motion is attained, for according to the present invention, the amount of movement of the thrust member is unlimited except for physical limitations of the design thereof. Both the force and the travel that may be attained are greater than possible in conventional solenoids-operated devices.

My improved device embodies a ferro-magnetic field structure providing at least two, preferably annular poles of opposite polarity, and two air gaps, one associated with each pole and in series with each other. There is a magnetic return structure in series with the air gaps and coaxial armature coils are disposed in said air gaps surrounding the magnetic return structure and mounted on a common member which is supported to permit axial motion of the coils with respect to the ferromagnetic structure. The flow of current in the coils is controlled by brushes or other means, so that the coils are oppositely polarized in each of said air gaps; i. e., the current flows around the magnetic return structure in opposite directions in each of the air gaps and thus the thrusts exerted by the coils are additive, or in the same direction at any given instant. A preferred embodiment of the invention comprises a thrust member formed of material of high permeability and having a conductor wound around it for a substantial portion of its length. The conductor is insulated from the ferro-magnetic material by suitable insulation. The thrust member, also referred to hereafter as the armature, is slideably mounted inside two or more coils or solenoids which coils themeslves are surrounded by transformer iron fields or cores laminated in planes parallel to the thrust member axis. The cores provide annular poles which surround the armature and the flux due to a current in the coils is provided with a path through the cores and the ferro-magnetic material of the thrust member. Brushes contact the armature to provide a current path through the armature and also through the coil or coils, which are, through brushes, connected in series with the conductor carried by the ferro-magnetic thrust member or armature. Current flowing in the conductor produces a flux field which acts with the field set up by the coils to exert a force substantially in the direction of the axis of the armature. The circuit connections insure that the directions of flow of current in the portions of the conductor within the several coils are always such that the resultant forces exerted by such portions on the thrust member are all in the same axial direction at any given instant. Thus, the thrust member may be indefinitely long, save for physical limitations, and the stroke of the member may be substantially equal to its length, less the length of the coils.

Referring now to the drawings in which the invention is illustrated in somewhat diagrammatic fashion:

Figure 1:
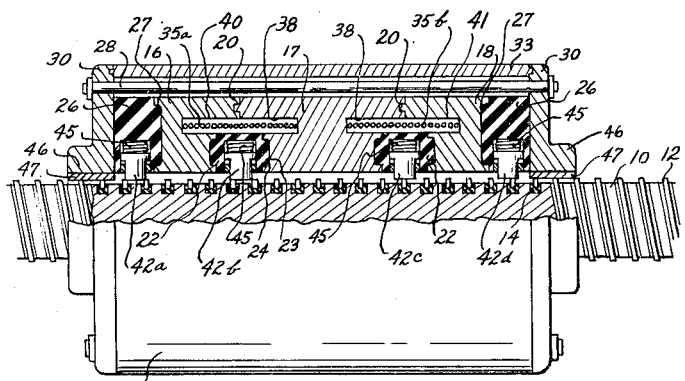
Figure 1 is an elevation, partly in section through a series-connected device embodying my invention.

In the drawings, 10 represents the thrust member or armature and consists of a round ferro-magnetic bar in which is cut a continuous helical groove. This groove preferably is in the form of a standard acme-type thread, although it will be understood that other thread cross sections and constructions may be used. It is through this ferro-magnetic bar that the flux field set up by the coils passes. A continuous heavy copper conductor 12 is wound in the helical groove and is insulated from it by channel-shaped insulation 14. This insulation may be mica, Bakelite, fish paper, or any other suitable dielectric material. The conductors stand above the surface of the thrust member and are lathe turned to the same external diameter (somewhat greater than the diameter of the bar 10), for engagement by brushes as hereinafter described, the conductor itself acting in the manner of a commutator.

Figure 2:
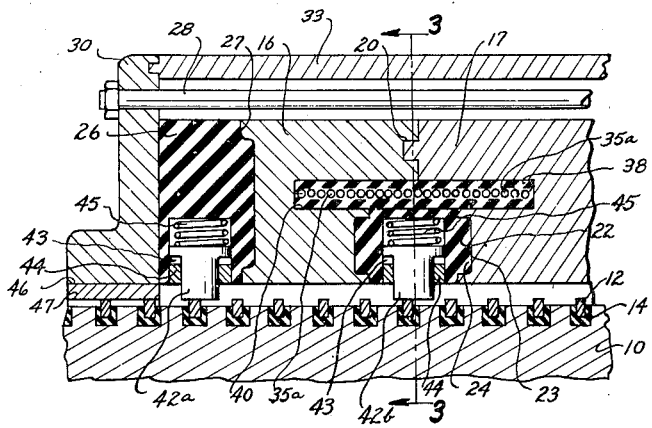
Figure 2 is a section in the plane of Figure 1 but showing in enlarged form a detail of certain of the parts.

Surrounding the bar 10 are the toroidal field or core elements that provide the flux path for the coils and consist of three toroidal core sections 16, 17 and 18. The sections 16 and 18 are end sections, and 17 represents the central section. (Their construction is best shown in Figure 2.) One or more of the latter sections may be employed as desired, in which case the number of windings likewise is increased. These cores consist of laminated transformer iron plates so mounted that they lie in planes parallel to the axis of the thrust bar 10.

To assist in holding the entire field assembly in position, the laminations are formed as shown at 20 to provide a tongue in one lamination adapted to fit in a corresponding groove in the opposing lamination. This retains the laminations concentrically in line with reference to the axis of the armature 10. The faces of the pole elements 16 and 17 or 17 and 18 on each side of the tongue and groove 20, and radially outside the coils in the core, should abut over as large an area as is possible to provide a continuous magnetic circuit as hereafter described.

Radially inwardly of the coils the core sections 16, 17 and 17, 18 are separated by a dielectric ring 22. To retain the core sections and associated rings 22 concentrically in line with reference to the axis of the armature 10 the adjacent core faces are recessed as at 23 to receive annular tongues 24 of respective ring 22.

The arrangement and mounting of the cores is such that in essence two annular C-shaped cores are provided with one section in common. Thus if the pole of the central section 17 is north adjacent the armature 10 the annular poles of the end cores 16 and 18 will be south as indicated by the letters N and S in Figure 4. The pole faces are annular and the lines of force extend radially between the pole faces and the armature or core. Thus the conductor 12 cuts the lines of force substantially at right angles.

As described below, the circuit arrangements are such that the thrusts exerted by the several portions of the conductors are all in the same direction.

At each end of the field a dielectric ring 26 is mounted, positioned radially by an annular groove 27 in the adjacent end section 16 or 18. The entire unit is enclosed and secured together by bolts 28 passing through end plates 30 which in turn bear against dielectric ends 26. A cylindrical outer protecting case member 33 is provided and fitted as indicated into each of the end plates 30.

Cylindrical coils or solenoids encircling the thrust bar are provided as indicated at 35a and 35b. When current is passed through these coils, the inner surfaces of the field sections 16, 17 and 18 constitute continuous annular magnetic poles, the winding of the coils being such that alternate poles are of opposite polarity, as noted above and indicated in Figure 4. Prior to assembly of the core sections, the two coils are positioned in axially extending annular slots 38 of the central core section 17, and 40 and 41 of the end sections 16 and 18, respectively, and insulated therefrom. Leads from the solenoids are brought to the outside of the unit.

Electrical contact with the copper conductor 12 is established by brushes 42a, 42b, 42c and 42d positioned in the fixed frame as shown in Figure 2 with respect to brushes 42a and 42b and connected through suitable leads to the outside of the frame. These brushes are positioned at the outer ends of the cores or field sections in the rings 26 and also in the rings 22 midway between the ends of each coil between the field sections 16 and 17, and 17 and 18. The brushes supply current to the conductor, the directions of flow of current in the portions of the conductor within each annular pole face being such that the forces are unidirectional, as will be explained in greater detail below.

To support the brushes each of the central rings 22 and outer rings 26 is bored as at 43. The brushes have T ends, as shown, and prior to assembly are placed in metallic liners 44 that are force fitted in the bores 43. Small coil springs 45 urge the brushes radially inwardly into contact with the copper conductor 12. The inward travel of the brushes is limited by their T ends.

To support the armature in the case, sliding bearings carried by the latter support the former at at least two places. One way of doing this, and others are contemplated as within the scope of the invention, is shown in the drawings. The bearing shown is formed by extending the end plates 30 inwardly and axially as shown at 46 to provide at each end of the case a bearing. This bearing preferably is lined with a graphited bearing sleeve 47 to lubricate the bearing and still avoid coating the conductor 12 with an insulating film as would be the case if oil were used as a lubricant.

Figure 4:
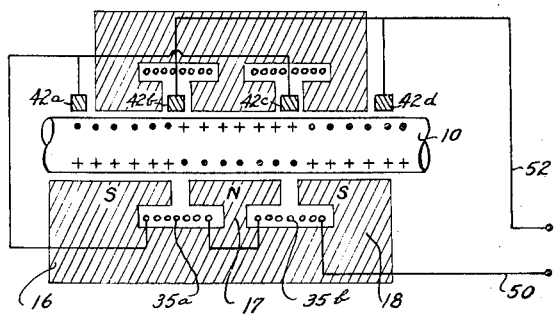
Figure 4 is a circuit diagram of the series-connected device.

The electrical circuit employed with a series-connected device of my invention is shown in Figure 4. Current flows from a suitable source through the coils 35a and 35b which are connected in series and are arranged so that the annular pole faces 16, 17 and 18, will be alternately of opposite polarity. In the embodiment shown, the pole 16 is indicated as a south pole, 17 as a north pole and 18 as south. The armature or thrust member is in series with the coils 35a and 35b, brushes 42a and 42c being connected in parallel, the current flowing from coil 35a to these brushes, and brushes 42b and 42d being connected in parallel and to the other terminal of the source. By this arrangement the direction of flow of current around the armature or thrust member is reversed between successive pairs of brushes as indicated diagrammatically in Figure 4, wherein the dots (.) indicate current flowing toward the observer, and the plus (+) signs indicate current flowing away from the observer. Thus the current flows in one direction around the armature in that portion of the conductor that is, at any given instant, adjacent the pole 16 and between the brushes 42a and 42b, in the opposite direction in that portion adjacent the pole 17 and between the brushes 42b and 42c, and in the first direction in that portion adjacent the pole 18 and between the brushes 42c and 42d. Thus the resultant translatory forces are all in the same direction. The direction of motion of the thrust member can be reversed by reversing the connections to either the field coils 35a and 35b or the brushes.

Figure 5:
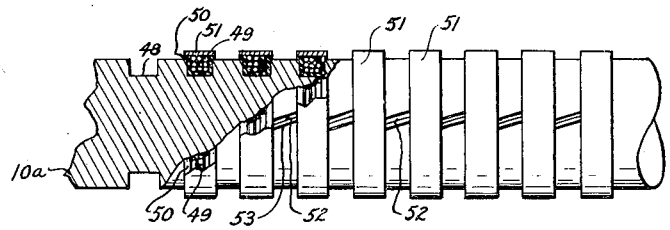
Figure 5 is a detail, partly in section, of a thrust member or armature for a shunt-connected device.
Figure 6:
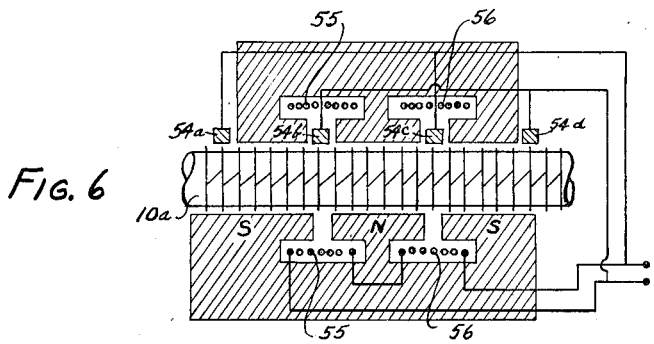
Figure 6 is a circuit diagram of a shunt-connected device.
Figure 3:
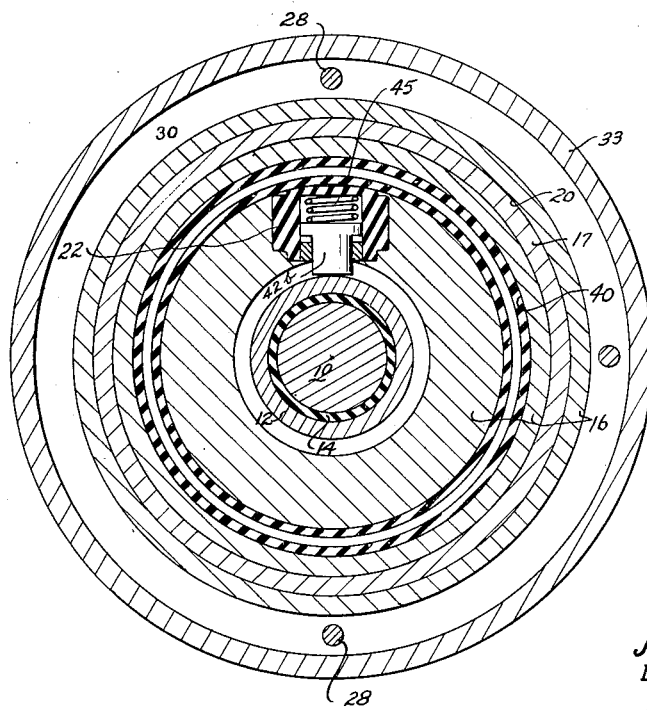
Figure 3 is a section through Figure 2 as indicated by the lines 3—3 thereon.

My invention may be embodied in shunt-connected devices, a modified form of thrust member preferably employed in such a device being shown in Figure 5. Here the thrust member or armature 10a is provided with annular grooves 48 in which coils 49, each composed of a plurality of turns, are disposed. The groove 48 at the left in the drawing is shown without a coil for convenience of illustration. The coils 49 are insulated from the thrust member by insulation 50 and are surrounded by rings 51 of copper, for example, which are adapted to be engaged by the brushes and conduct current to the coils. Each coil is connected at one point to its associated ring 51 and adjacent coils 49 are interconnected by conductors 52 extending through diagonal slots 53 in the surface of the thrust bar 10a. By this arrangement it is possible to provide the requisite number of turns of wire required for a shunt-connected device, the connections being such that all of the coils 49 between adjacent brushes are in series, but as shown in Figure 5, the brushes 54a, 54b, 54c and 54d are all in shunt with the coils 55 and 56. The mechanical construction of the shunt-connected device may be similar in all material respects to the series-connected device shown in Figures 1 and 2, except for the above described change in construction of the armature or thrust member. As will be evident from the wiring diagram, the direction of flow of current around the armature is reversed adjacent alternate poles as described in connection with the series-connected device.

In both the series and shunt types, the size and number of turns of wire on the armature and in the coils, the size and proportions of the field structure and armature core, and similar details can be varied in accordance with the service for which the particular device is designed and the nature of the current supply. The design of a particular device may be carried out in accordance with well known electrical principles, to meet the requirement of these and other factors. The mechanical features may be changed substantially, for example, the inner part may be made stationary while the outer part moves with respect to it.

From the foregoing description it will be seen that I have provided an improved device of the class described that is simple and positive in operation, that can be constructed to act with great force and in which the length of the stroke is not limited by the length of the fixed support. Obviously, more than two field coils can be employed where it is desired to obtain a greater thrust. Various other changes and modifications may be made in the invention without departing from the spirit and scope thereof. Therefore, it is to be understood that my patent is not limited to the preferred forms described herein or in any manner other than by the scope of the appended claims.

I claim:

1. In a device of the class described, a fixed support comprising a solenoid to establish a fixed flux field, sliding bearings at each end thereof, a high permeability armature member, a thread-like conductor thereon and insulated therefrom and journalled in said sliding bearings to permit axial movement of said armature member in said support, brushes carried by said support in contact with said conductor to establish a current therein and a flux field thereabout, said latter field acting in cooperation with said fixed field to move said armature axially of said support.

2. In a device of the class described, a fixed support comprising a plurality of aligned coils, a field structure associated with said coils and providing a plurality of annular poles, alternate poles being of opposite polarity, and bearings at each end of said support, an armature member slideably mounted in said bearings and disposed within said poles, a conductor wound on said armature member and insulated therefrom, said armature member being slidably supported in said bearings by said conductor, brushes carried by said support and disposed between and at the ends of said poles and in contact with said conductor to establish a current therein, alternate brushes being of opposite polarity whereby the direction of flow of current in said conductor is always in one direction in that portion of said conductor adjacent a pole of one polarity and in the opposite direction in that portion adjacent a pole of opposite polarity and the thrust exerted by said conductor throughout the length of the armature is in the same direction at any given instant.

3. An electrodynamic thrust device including in combination a cylindrical ferromagnetic armature, a continuous single-conductor open-circuited winding insulated from said armature and having a plurality of turns surrounding said armature, said winding being partially embedded in said armature and thereby being anchored against motion of said winding with respect to said armature, a field structure comprising a plurality of annular elements each including an annular pole, said annular poles together forming a discontinuous cylindrical pole structure concentric with said armature, said elements also providing an annular magnetic return structure outside of said pole and a radially extending web connecting each said pole with said return structure, a field coil associated with each adjacent pair of said annular elements, brushes located in the gaps between adjacent poles and of sufficient width in an axial direction to make continuous contact with said winding, said brushes being in fixed relation to said pole structure and said brushes being so connected to a current source as to render the individual thrusts exerted by each section of the armature within the pole structure additive with respect to each other.

4. An electrodynamic thrust device including in combination a cylindrical ferromagnetic armature having a helical groove in the surface thereof, an insulating lining within said groove, a continuous single-conductor open-circuited winding within said lining and anchored to prevent motion of said winding with respect to said armature, said winding having a smooth external surface of a diameter greater than the diameter of said armature, a field structure comprising a plurality of annular elements each including an annular pole, said annular poles together forming a discontinuous cylindrical pole structure concentric with said armature, said elements also providing an annular magnetic return structure outside of said pole and a radially extending web connecting each said pole with said return structure, a field coil associated with each adjacent pair of said annular elements, brushes located in the gaps between adjacent poles and of sufficient width in an axial direction to make continuous contact with said winding, said brushes being in fixed relation to said pole structure and said brushes being so connected to a current source as to render the individual thrusts exerted by each section of the armature within the pole structure additive with respect to each other.

5. An electrodynamic thrust device including in combination a cylindrical ferromagnetic armature having a plurality of grooves in the surface thereof, a continuous single-conductor open-circuited winding providing a plurality of turns within each such groove and anchored to prevent motion of said winding with respect to said armature, an annular contact member associated with each such groove, each of said contact members, except those at the ends of the armature, being connected to the windings in two adjacent grooves and the members at the ends of the armature being connected to the windings in the adjacent end grooves, and said members having smooth external surfaces of a diameter greater than the diameter of the armature, a field structure comprising a plurality of annular elements each including an annular pole, said annular poles together forming a discontinuous cylindrical pole structure concentric with said armature, said elements also providing an annular magnetic return structure outside of said pole, and a radially extending web connecting each said pole with said return structure, a field coil associated with each adjacent pair of said annular elements, brushes located in the gaps between adjacent poles and of sufficient width in an axial direction to make continuous contact with said members, said brushes being in fixed relation to said pole structure and said brushes being so connected to a current source as to render the individual thrusts exerted by each section of the armature within the pole structure additive with respect to each other.

JOHN J. MOYNIHAN.

REFERENCES CITED

The following references are of record in the file of this patent:

UNITED STATES PATENTS

| Number | Name | Date |
| --- | --- | --- |
| 448,328 | Entz | Mar. 17, 1891 |
| 561,899 | Leffler | June 9, 1896 |
| 1,986,639 | Konn | Jan. 1, 1935 |
| 2,003,647 | Dillstrom | June 4, 1935 |